(12) United States Patent
Soppelsa (10) Patent No.: US 12,140,977 B2
(45) Date of Patent: Nov. 12, 2024

(54) REGULATION SYSTEM FOR A THERMO-HYDRAULIC CIRCUIT AND CONTROL METHOD

(71) Applicant: ACCADEMIA EUROPEA BOLZANO—EURAC RESEARCH, Bolzano (IT)

(72) Inventor: Anton Soppelsa, Bolzano (IT)

(73) Assignee: ACCADEMIA EUROPEA BOLZANO—EURAC RESEARCH, Bolzano (IT)

( * ) Notice: Subject to any disclaimer, the term of this patent is extended or adjusted under 35 U.S.C. 154(b) by 240 days.

(21) Appl. No.: 17/961,184

(22) Filed: Oct. 6, 2022

(65) Prior Publication Data
US 2023/0109989 A1 Apr. 13, 2023

(30) Foreign Application Priority Data
Oct. 7, 2021 (IT) .......................... 102021000025670

(51) Int. Cl.
*G05D 23/19* (2006.01)
(52) U.S. Cl.
CPC .................................. *G05D 23/1931* (2013.01)
(58) Field of Classification Search
CPC ......... F24D 2220/044; F24D 2220/042; F24D 17/0078; F24D 19/1024; F24D 19/1012; F24D 19/1009; G05D 23/1931
See application file for complete search history.

(56) References Cited

U.S. PATENT DOCUMENTS

| | | | | |
|---|---|---|---|---|
| 3,608,818 A | * | 9/1971 | Von Fellenberg | .. F24D 19/1012 237/63 |
| 7,021,073 B2 | * | 4/2006 | Sakakibara | ........... F24H 15/174 62/238.7 |
| 10,690,423 B2 | * | 6/2020 | Kallesøe et al. | ......... F24F 11/88 |
| 11,149,964 B2 | * | 10/2021 | Tsouvalas | ................ F24F 11/30 |

(Continued)

FOREIGN PATENT DOCUMENTS

| | | |
|---|---|---|
| DE | 2940790 C1 | 3/1982 |
| EP | 3492822 A1 | 6/2019 |

(Continued)

*Primary Examiner* — Nelson J Nieves
(74) *Attorney, Agent, or Firm* — CANTOR COLBURN LLP (57) ABSTRACT

A system for regulating a thermo-hydraulic circuit has a thermal machine, a heat exchange terminal, a carrier fluid circulation system having a delivery duct, a return duct, and a three-way valve. The system has a pump, a first temperature sensor measuring post-valve delivery temperature of the carrier fluid downstream of the three-way valve, a second temperature sensor measuring pre-valve delivery temperature of the carrier fluid, and a third temperature sensor measuring temperature of the carrier fluid downstream of the heat exchange terminal. A flow or flow rate sensor measures a mass or volumetric flow rate of the carrier fluid. An electronic control unit has a storage device in which a model function of the thermo-hydraulic circuit is stored. A processing unit calculates values of a valve control signal and a pump control signal as function of a mass or volumetric flow rate error and a carrier fluid delivery temperature error.

8 Claims, 4 Drawing Sheets

(56) References Cited

U.S. PATENT DOCUMENTS

| | | | |
|---|---|---|---|
| 2010/0212604 A1* | 8/2010 | Kim | F24D 17/0078 |
| | | | 122/32 |
| 2010/0329650 A1* | 12/2010 | Kim | F24D 19/1009 |
| | | | 219/494 |
| 2013/0025301 A1* | 1/2013 | Maitani | F24D 19/1012 |
| | | | 62/159 |
| 2016/0305671 A1* | 10/2016 | Madigan | F24D 19/1063 |
| 2020/0080730 A1 | 3/2020 | Paine | |
| 2021/0095866 A1* | 4/2021 | Chaudhry | F24H 15/335 |
| 2022/0268476 A1* | 8/2022 | Cimberio | F24F 11/63 |
| 2024/0060655 A1* | 2/2024 | Chiavetti | F24D 19/0092 |

FOREIGN PATENT DOCUMENTS

| | | | | |
|---|---|---|---|---|
| EP | 3671050 | A1 | 6/2020 | |
| EP | 3374699 | B1 * | 9/2020 | F04D 13/12 |
| WO | 2008039065 | A1 | 4/2008 | |
| WO | 2020065417 | A1 | 4/2020 | |

* cited by examiner

FIG.5

REGULATION SYSTEM FOR A THERMO-HYDRAULIC CIRCUIT AND CONTROL METHOD

CROSS-REFERENCE TO RELATED APPLICATION

This application claims priority to Italian Patent Application No. 102021000025670 filed on Oct. 7, 2021, the contents of which are incorporated by reference in their entirety.

FIELD OF THE INVENTION

The present invention relates to the field of systems for controlling temperatures and mass or volumetric flow rates inside (thermal) energy distribution systems.

In particular, the present invention relates to a regulation system for a thermo-hydraulic circuit configured to jointly control the temperature and mass or volumetric flow rate in a thermal energy distribution system, such as for example, but not exclusively, heating and cooling systems used in residential buildings or in industrial plants for the distribution of energy from a thermal machine (or from a thermal energy storage) to the radiator or between heat pump and one or more thermal energy storages.

BACKGROUND OF THE INVENTION

The current automated management technologies allow implementing highly efficient temperature control systems or can be associated with pre-existing thermoregulation systems to optimize the performance thereof.

The known thermoregulation systems for thermo-hydraulic circuits are generally managed so as to ensure a desired temperature in one or more volumes to be heated or cooled, e.g., the temperature of the air in the case of one or more residential units of a building and/or in individual rooms thereof, or the temperature of a carrier fluid inside a chamber or duct at a given point to be controlled, e.g., at the inlet of one or more industrial machines.

The systems controlling the opening or closing of a three-way valve within such regulating systems suitably mix the delivery carrier fluid of the plant with the return carrier fluid.

An example of the aforesaid systems is described in document WO2020/065417.

However, the systems of the prior art, and in particular the related thermoregulation control systems, do not allow adequately managing quick achievement of the desired optimal temperature. Indeed, the control systems of the prior art require several iterative cycles to reach the optimal operation of the plant as a function of the available control parameters (typically, the opening/closing of the three-way valve alone).

SUMMARY OF THE INVENTION

Therefore, the need is strongly felt to provide a regulation system for a thermo-hydraulic circuit and a control method for a regulation system for a thermo-hydraulic circuit capable of overcoming the drawbacks of the prior art.

Such a need is met with a regulation system for a thermo-hydraulic circuit and a control method as described and claimed herein. Preferred or advantageous embodiments of the present invention are also described.

BRIEF DESCRIPTION OF THE FIGURES

The features and advantages of the regulation system for a thermo-hydraulic circuit and the control method for the regulation system for a thermo-hydraulic circuit will be apparent from the following description of preferred embodiments thereof, given by way of a non-limiting indication, with reference to the accompanying drawings, in which.

DETAILED DESCRIPTION

With reference to the drawings, reference numeral 1000 indicates a regulation system for a thermo-hydraulic circuit as a whole, i.e., a system for controlling the temperature of a fluid in a volume intended to be heated or cooled. For example, the regulation system for a thermo-hydraulic circuit is a heating system or a cooling system or an air conditioning system for a building comprising the thermo-hydraulic circuit, where the volume be heated or cooled is, for example, the volume of air of a room of the building or of the whole building, or is a volume of fluid inside heat exchange terminals or radiators.

Figure 1:
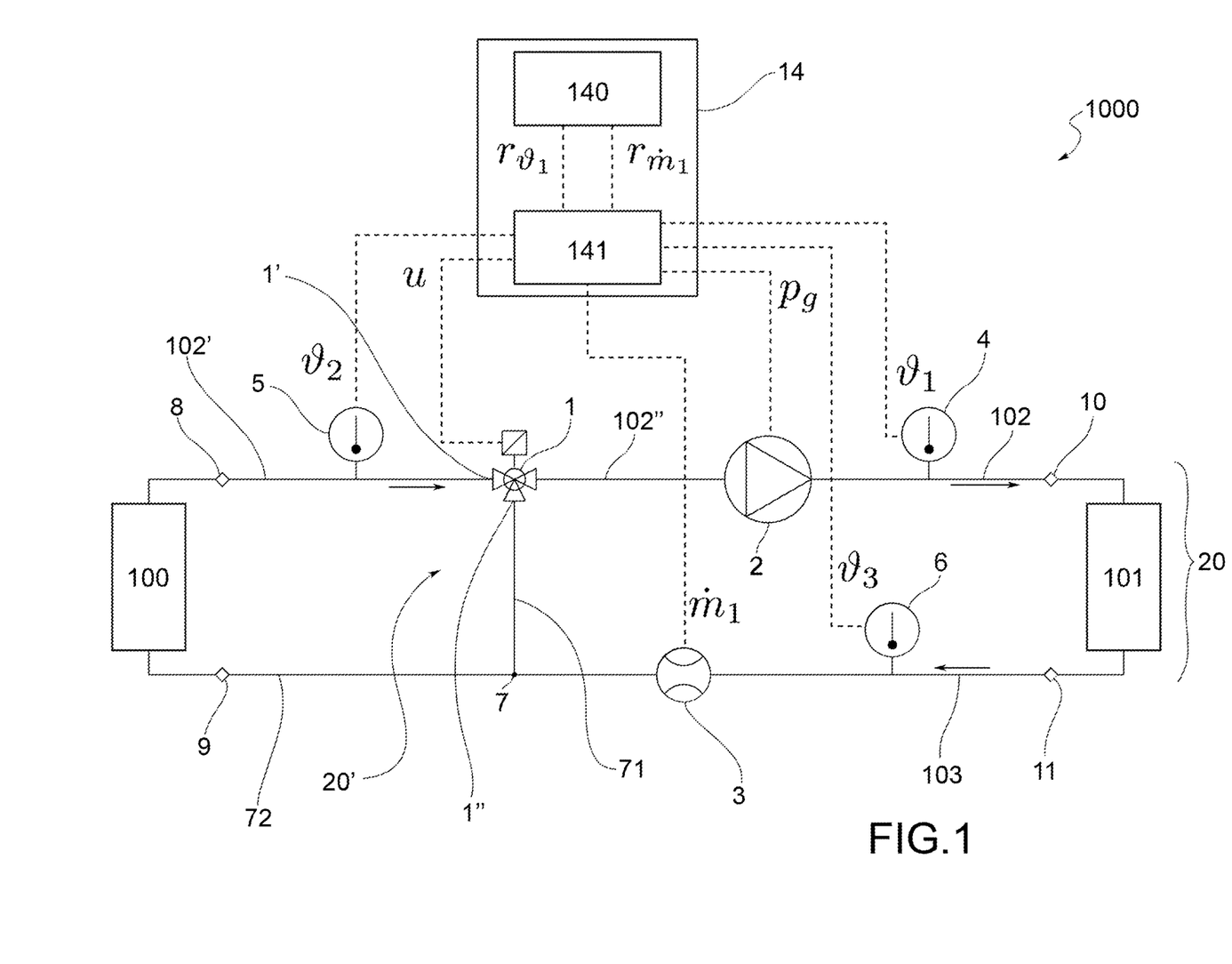
FIG. 1 shows a diagram of a regulation system for a thermo-hydraulic circuit according to an embodiment of the present invention.

The regulation system 1000 for a thermo-hydraulic circuit, an embodiment of which is diagrammatically shown in greater detail in FIG. 1, comprises a thermo-hydraulic circuit 20 and an electronic control unit 14. The thermo-hydraulic circuit 20 comprises a thermal machine 100, e.g., a heat generator (a boiler or a heat pump or a heat exchanger or the like) or a heat absorber (an air conditioner or the like), adapted to heat or cool a carrier fluid. Moreover, the thermo-hydraulic circuit 20 comprises at least one heat exchange terminal 101. Heat exchange terminal means any thermal machine or thermo-hydraulic configuration adapted to exchange heat with a thermal load, e.g., a radiant terminal, one or more radiators, convectors, fan heaters, floor or ceiling radiant panels or radiant tube bundles or the like, or one or more heat exchangers, or one or more thermal storages, or one or more hydraulic separators upstream of one or more radiant terminals, or a combination thereof.

The thermo-hydraulic circuit 20 further comprises a carrier fluid circulation system 20' adapted to allow the circulation of a carrier fluid inside the thermo-hydraulic circuit 20. The carrier fluid circulation system 20' includes a delivery duct 102 for transferring the carrier fluid from the thermal machine 100 to the heat exchange terminal 101, and a return duct 103 for transferring the carrier fluid from the heat exchange terminal 101 towards the thermal machine 100.

A three-way valve 1 is arranged along the delivery duct 102 and is fluidically connected to the thermal machine 100 and the return duct 103. The three-way valve 1 is operable to mix the carrier fluid in the delivery duct 102 with the carrier fluid in the return duct 103.

The delivery duct 102 allows the carrier fluid to flow from the thermal machine 100 to the heat exchange terminal 101, and possibly to other elements (not shown) of the thermo-hydraulic circuit 20, such as a boiler/tank for domestic hot water, for example.

The return duct 103 allows a carrier fluid flow from the heat exchange terminal 101 to return towards the thermal machine 100 and towards the three-way valve 1.

A pump 2 is installed on the delivery duct 102 and is adapted to pump the carrier fluid through the carrier fluid circulation system.

According to a variant (not shown), the pump 2 is installed on the return duct 103 upstream of the three-way valve 1, i.e., before the three-way valve 1 and downstream of the heat exchange terminal 101, in the circulating direction of the carrier fluid (diagrammatically indicated by the arrows in FIG. 1).

Preferably, the three-way valve 1 is arranged on the delivery duct 102 between the thermal machine 100 and the pump 2, along the delivery duct 102. The three-way valve 1 may be activated to mix the carrier fluid from a thermal machine outlet 8 of the thermal machine 100 (e.g., a "hot" carrier fluid of the thermal machine) with the "cold" carrier fluid from a radiator outlet 11 of the heat exchange terminal 101 so as to regulate—in particular, to lower in the case of "hot" fluid from the thermal machine or to heat in the case of "cold" fluid from the thermal machine—the temperature of the carrier fluid in the delivery duct 102 leaving the three-way valve 1. In other words, the delivery duct 102 comprises a first duct portion 102' connecting the thermal machine outlet 8 to a first inlet 1' of the three-way valve and in which carrier fluid directly from the thermal machine 100 circulates. Moreover, the delivery duct 102 also comprises a second duct portion 102" which is directly connected to a valve outlet of the three-way valve 1 and in which a mixed carrier fluid circulates, i.e., a carrier fluid obtained by mixing the carrier fluid directly from the thermal machine 100 with the carrier fluid from the heat exchange terminal 101, in particular from the radiator outlet 11 of the heat exchange terminal.

The thermo-hydraulic circuit 20 comprises at least a first temperature sensor 4 installed on the delivery duct 102 downstream of the three-way valve 1, i.e., preferably on the second duct portion 102", and even more preferably downstream of pump 2. The first temperature sensor 4 is adapted to measure the post-valve delivery temperature $\vartheta_1$ of the carrier fluid downstream of the three-way valve 1 in the flowing direction of the carrier fluid.

The thermo-hydraulic circuit 20 also comprises at least a second temperature sensor 5 installed on the delivery duct 102 or inside the thermal machine 100, upstream of the three-way valve 1, i.e., preferably on the first duct portion 102'. The second temperature sensor 5 is adapted to measure the pre-valve delivery temperature $\vartheta_2$ of the carrier fluid upstream of the three-way valve 1 in the flowing direction of the carrier fluid.

The thermo-hydraulic circuit 20 further comprises at least a third temperature sensor 6 installed on the return duct 103 or inside the heat exchange terminal 101 and adapted to measure the temperature $\vartheta_3$ of the carrier fluid downstream of the heat exchange terminal 101 in the flowing direction of the carrier fluid. Such a third temperature sensor 6 is further installed upstream of the three-way valve 1.

Moreover, at least one flow or flow rate sensor 3 is installed in the fluid circulation system to measure a mass or volumetric flow rate $\dot{m}_1$ of the carrier fluid in an area of the fluid circulation system 20'. Preferably, the flow or flow rate sensor 3 is installed on the return duct 103, even more preferably is installed downstream of the heat exchange terminal 101 and upstream of a second inlet 1" of the three-way valve 1.

According to an advantageous embodiment, the flow or flow rate sensor 3 is installed before a point 7 of bifurcation of the return duct 103 into two duct branches 71, 72, where a first branch 71 of the two branches 71, 72 is connected to the second inlet 1" of the three-way valve 1 and the second branch 72 of the two branches is connected to the thermal machine 100, and in particular to the machine inlet 9 of the thermal machine 100.

The electronic control unit 14 is operatively connected to the three-way valve 1, the pump 2, the first temperature sensor 4, the second temperature sensor 5, the third temperature sensor 6, and the flow or flow rate sensor 3, to read parameters or control the activation thereof.

The electronic control unit 14 is configured to acquire the post-valve delivery temperature $\vartheta_1$, the pre-valve delivery temperature $\vartheta_2$, the carrier fluid temperature $\vartheta_3$ downstream of the heat exchange terminal 101, the value of mass or volumetric flow rate $\dot{m}_1$ of the carrier fluid, from the respective sensor.

Figure 2:
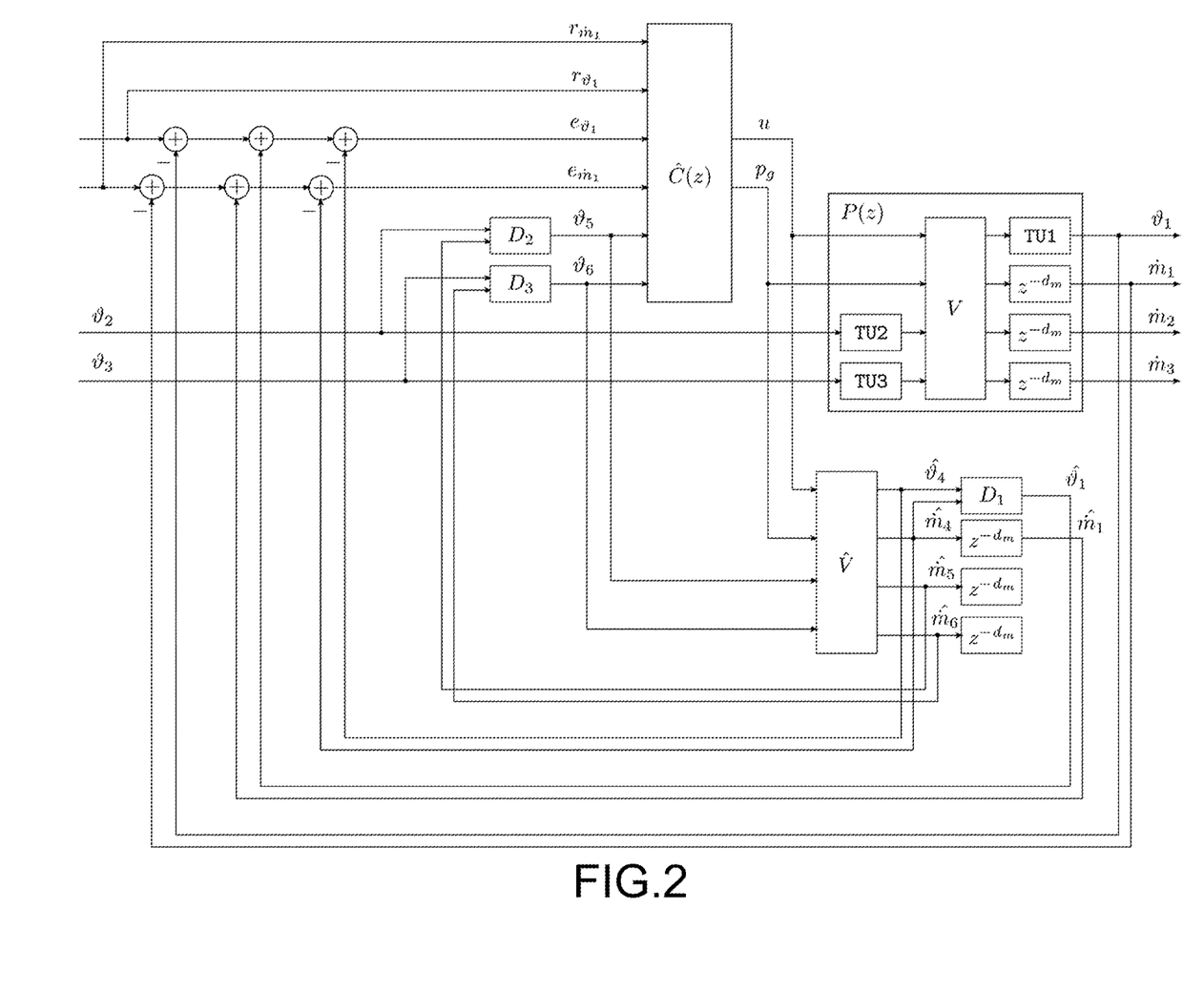
FIG. 2 shows a functional block diagram of the control algorithm configured in the electronic control unit.

Moreover, the electronic control unit 14 comprises a storage device 140 in which a model function $\hat{V}$ of the operation of the valve connected to the thermo-hydraulic circuit 20 is stored, and a processing unit 141 configured to calculate the values of certain signals described hereinbelow and which will be better understood with reference to FIG. 2 showing an example of a control diagram uploaded in the processing unit 141.

The processing unit 141 is configured to calculate a valve control signal u adapted to determine an opening value of the three-way valve 1 for mixing the carrier fluid from the thermal machine 100 and from the heat exchange terminal 101 as a function of (i.e., according to a processing of) the opening value of the three-way valve 1.

Moreover, the processing unit 141 is configured to calculate a pump control signal $p_g$ adapted to regulate the value of power delivered by the pump, i.e., the mass or volumetric flow rate of the carrier fluid flow.

The processing unit 141 is further configured to calculate an estimated post-valve delivery temperature value $\hat{\vartheta}_1$ and an estimated mass flow rate value $\hat{m}_1$ as output values of the model function $\hat{V}$ of the thermo-hydraulic circuit 20.

In particular, the processing unit 141 is further configured to jointly calculate the estimated post-valve delivery temperature value $\hat{\vartheta}_1$ and an estimated mass flow rate value $\hat{m}_1$ as output values of the model function $\hat{V}$, i.e., in the same calculating iteration.

The processing unit 141 is further configured to calculate a carrier fluid delivery temperature error $e_{\vartheta_1}$ and a carrier fluid mass or volumetric flow rate error $e_{\dot{m}_1}$. The carrier fluid delivery temperature error $e_{\vartheta_1}$ is calculated by the processing unit 141 as a function of (e.g., by means of an algebraic sum) a desired post-valve delivery temperature value $r_{\vartheta_1}$, the measured post-valve delivery temperature $\vartheta_1$ and the estimated post-valve delivery temperature value $\hat{\vartheta}_1$.

Moreover, the carrier fluid mass or volumetric flow rate error $e_{\dot{m}_1}$ is calculated by the processing unit 141 as a function of a desired mass or volumetric flow rate value $r_{\dot{m}_1}$, the value of measured mass or volumetric flow rate $\dot{m}_1$ of the carrier fluid and the estimated mass or volumetric flow rate value $\hat{m}_1$.

Therefore, the valve control signal u and the pump control signal $p_g$ are calculated as a function of the mass flow rate error $e_{\dot{m}_1}$ and the carrier fluid delivery temperature error $e_{\vartheta_1}$.

According to an embodiment, the model function $\hat{V}$ consists of a family of similar transformations combined with one another by a fuzzy system of the Takagi-Sugeno type.

According to an advantageous embodiment, the valve control signal u and the pump control signal $p_g$ are also calculated as a function of the desired mass or volumetric flow rate value $r_{\dot{m}_1}$, the desired post-valve delivery temperature value $r_{\vartheta_1}$, the value of the pre-valve delivery temperature $\vartheta_2$, the temperature $\vartheta_3$ of the carrier fluid downstream of the heat exchange terminal 101. In this variant, the pre-valve delivery temperature $\vartheta_2$ and the temperature $\vartheta_3$ of the carrier fluid downstream of the heat exchange terminal 101 are suitably delayed over time by a respective delay line $D_2$, $D_3$, (e.g., a transfer function which delays the pre-valve delivery signal $\vartheta_2$ and the temperature $\vartheta_3$ of the carrier fluid) to obtain a delayed pre-valve delivery temperature $\vartheta_5$ and a delayed temperature $\vartheta_6$ of carrier fluid downstream of the heat exchange terminal 101.

Preferably, the estimated post-valve delivery temperature value $\hat{\vartheta}_1$ is calculated through a third delay line (e.g., a transfer function which delays the signal) from a first post-valve delivery temperature value $\hat{\vartheta}_4$ output by the model function $\hat{V}$ and the estimated mass flow rate value $\hat{m}_1$ is calculated by adding a second predefined time delay to a first mass flow rate value $\hat{m}_4$ output by the model function $\hat{V}$.

According to an embodiment, the delayed pre-valve delivery temperature $\vartheta_5$, the delayed temperature $\vartheta_6$ carrier fluid downstream of the heat exchange terminal 101 are calculated as a function of the delayed valve control signal u according to a predetermined delay range and the delayed control signal $p_g$ to pump 2 according to a second predetermined delay range.

According to an advantageous embodiment, the delayed pre-valve delivery temperature $\vartheta_5$, the delayed temperature $\vartheta_6$ of carrier fluid downstream of the heat exchange terminal 101 and the estimated post-valve delivery temperature $\hat{\vartheta}_1$ are calculated through auxiliary delay lines which process the value of mass or volumetric flow rate signals $\hat{m}_5$, $\hat{m}_6$ and $\hat{m}_4$ estimated by the model function $\hat{V}$, respectively, which in turn calculates them by processing the value of the control signal u to valve 1 and the value of the control signal $p_g$ to pump 2.

With particular reference to FIG. 2, the processing logic executed in the electronic control unit 14 for controlling the regulation system 1000 for a thermo-hydraulic circuit will be described in greater detail below.

According to the embodiment in FIG. 2, the block P(z) is the actual plant, schematized in FIG. 1, and which is reached by the valve control signal u and the pump control signal $p_g$.

The block $\hat{V}$ is the model (or observer) function which allows estimating values of a status of not directly observable parameters. The model function $\hat{V}$ together with the special delay blocks indicated on the right in FIG. 2 ($D_1$, $z^{-dm}$) are a predictor which models the actual plant P(z).

The block indicated by $\hat{C}(z)$ is the controller, i.e., the series of code instructions executed by the processing unit 141 to calculate the valve control signal u and the pump control signal $p_g$.

The further blocks $D_1$, $D_2$ and $D_3$ instead are particular delay lines provided with two inlets, one for the quantity to be delayed, the other for a quantity of the volumetric or mass flow rate type, employed in order to obtain a delay depending on the values taken by the latter in past instants.

According to an embodiment, the value of the quantity output from the particular delay line ($\hat{m}_1$, $\vartheta_5$ or $\vartheta_6$) is calculated by linearly interpolating the last two elements of a circular queue containing pairs of values representing the value taken by the quantity at the input of the particular delay line ($\hat{m}_1$, $\vartheta_2$ or $\vartheta_3$) in past instants and the current position of each of these values within the delay line. In an advantageous formulation, the positions are iteratively updated in a proportional manner to the fluid flow rate ($\hat{m}_4$, $\hat{m}_5$ or $\hat{m}_6$) and the integration step. Each time the position of the last element in the queue exceeds a characteristic length associated with the special delay line (violation of the condition on the position), such an element is removed from the queue and re-introduced at the beginning of the queue, thus decreasing its positional coordinate of the characteristic length of the special delay line and assigning to the value of the input quantity, the value of the input quantity that this has when the violation of the condition on the position is detected.

Figure 3:
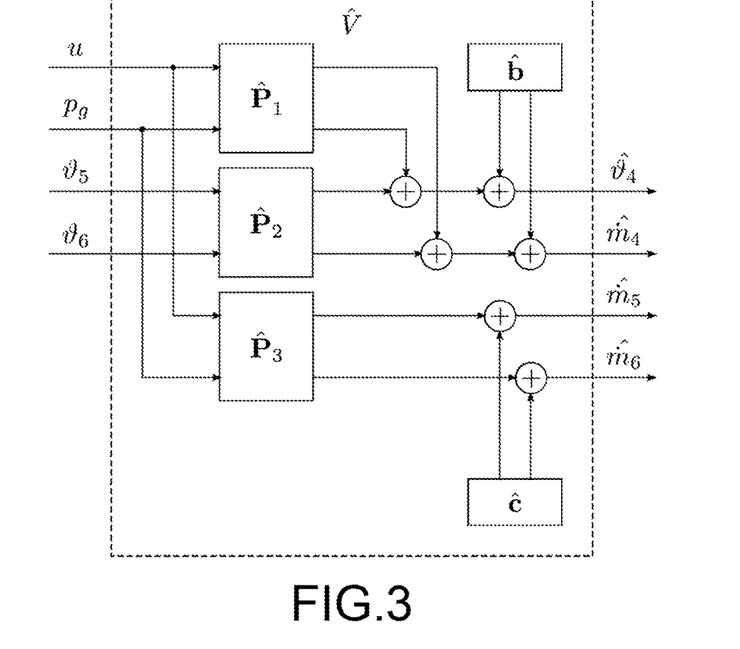
FIG. 3 shows a detailed functional block diagram of a model function of the block diagram in FIG. 2.

An example of model function $\hat{V}$ is shown in FIG. 3, for example. According to an embodiment, the model of the plant can be obtained through a Takagi-Sugeno model V of the system.

This means that, according to an embodiment, the quantities $\hat{\vartheta}_4$ and $\hat{m}_4$ are the result of a similar transformation of the quantities $p_g$, u, $\vartheta_5$ and $\vartheta_6$, where the coefficients of the transfer matrix and the known term are in turn determined as a function of the variables u and $p_g$, for example as $$\begin{bmatrix} \hat{\vartheta}_4 \\ \hat{m}_4 \end{bmatrix} = \hat{P}_1(u, p_g) \begin{bmatrix} u \\ p_g \end{bmatrix} + \hat{P}_2(u, p_g) \begin{bmatrix} \vartheta_5 \\ \vartheta_6 \end{bmatrix} + \hat{b}(u, p_g).$$

Similarly, the quantities $\hat{m}_5$, and $\hat{m}_6$ are the result of a similar transformation of the quantities u and $p_g$, where the coefficients of the transfer matrix and the known term are in turn determined as a function of the variables u and $p_g$, for example as $$\begin{bmatrix} \hat{m}_5 \\ \hat{m}_6 \end{bmatrix} = \hat{P}_3(u, p_g) \begin{bmatrix} p_g \\ u \end{bmatrix} + + \hat{c}(u, p_g).$$

Moreover, the transfer matrixes $\hat{P}_1(u, p_g)$, $\hat{P}_2(u, p_g)$, $\hat{P}_3(u, P_g)$ and the known terms $\hat{b})u, p_g)$, $\hat{c}(u, p_g)$ are obtained as a convex combination of a certain number of similar models with constant coefficients, where the combiners are the membership functions of the variables u and $p_g$ in a suitable two-dimensional grid of fuzzy sets.

According to an alternative embodiment, the quantities $\hat{\vartheta}_4$ and $\hat{m}_4$ are calculated as a convex combination of the images of the quantities $p_g$, u, $\vartheta_5$ and $\vartheta_6$ through a certain number of similar transformations where the combiner coefficients are the membership functions of the variables $p_g$ and u in a two-dimensional grid of fuzzy sets. Similarly, the quantities $\hat{m}_5$ and $\hat{m}_6$ are calculated as a convex combination of the images of the quantities $p_g$, u through the same number of similar transformations, where the combiners are the same membership functions the variables $p_g$ and u in the two-dimensional grid of fuzzy sets.

Figure 4:
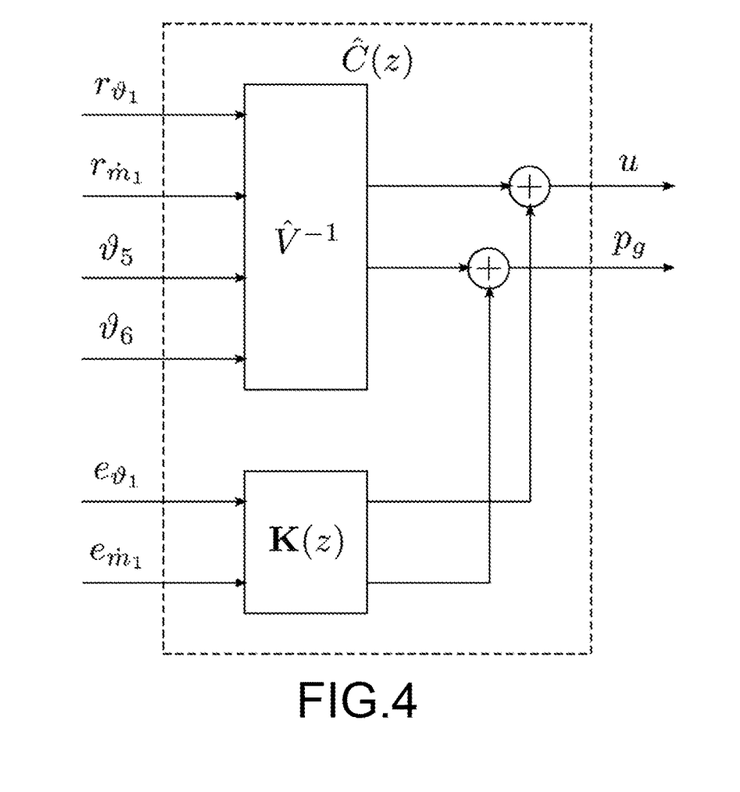
FIG. 4 shows a detailed block diagram of a controller included in the block diagram in FIG. 2.

An example of controller with $\hat{C}(z)$ is shown in FIG. 4. Here, the variables u and $p_g$ are the algebraic sum of an open chain component, calculated by the block $\hat{V}^{-1}$, and of a closed chain, calculated by the block K(z).

The function of the open chain component $\hat{C}(z)$ of the controller is that of obtaining a particular inverse of the model function $\hat{V}$ which exactly returns those values of the control variables $u_{FF}$ and $P_{g_{FF}}$ which, together with the current values of $\vartheta_5$ and $\vartheta_6$, are mapped by the model function right in the values of the references $r_{\vartheta_1}$ and $r_{m_1}$ given at the input of block $\hat{V}^{-1}$ together with the values $\vartheta_5$ and $\vartheta_6$.

In a convenient embodiment, such a block can be implemented by employing the generalized Newton-Raphson method for the multi-variable case.

Figure 5:
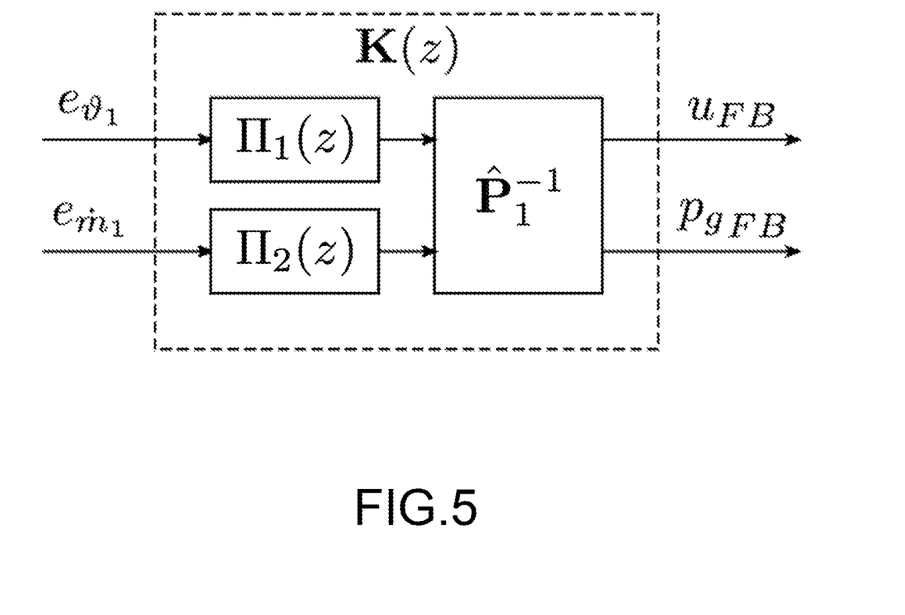
FIG. 5 shows a detailed block diagram of the feedback component of the controller in FIG. 4.

The feedback component $\hat{C}(z)$ of the controller is shown in FIG. 5. The function of this component K(z) is that of increasing, by taking advantage of the effect of the feedback connection, the disturbance rejection of the closed chain system and attenuating the effects of the residual modelling error in the long term.

The design of the feedback block can occur with various state-of-the-art techniques, but in an advantageous embodiment, this component is obtained using two controllers with one input and one output of proportional, integral and derivative type, one for the control chain related to the temperature ($\Pi_1(z)$), the other for that related to the volumetric or mass flow rate ($\Pi_2(z)$), connected in series to a decoupler element $P_1^{-1}$ which can be the inverse Jacobian matrix of the model function calculated at point $u_{FF}$, $p_{g_{FF}}$, $\vartheta_5$ and $\vartheta_6$.

The experimental determination of the coefficients of the Takagi-Sugeno models, and in general the parameters of the model function $\hat{V}$, can take place through the application, around the most significant working points, of linear identification techniques known at the state of the art or through the application of any other method of identifying parametric models known at the current or future state of the art.

The correct determination of the characteristic length of the special delay lines $D_1$, $D_2$ and $D_3$ is equally important. These parameters can be determined with identification methods known at the state of the art, but even better they can be determined based to the on-site measurement of the distance travelled by the fluid between the body of the three-way valve 1 and the temperature sensors 4, 5, 6, respectively.

As for the design and the resulting calibration of the coefficients of control block K(z), it can take place by virtue of the use of the model function $\hat{V}$, the inverse function $\hat{V}^{-1}$, and the delay lines $D_1$, $D_2$ and $D_3$, using any technique known at the state of the art.

Innovatively, the present invention allows brilliantly overcoming the aforementioned drawbacks with respect to the control systems for regulating thermo-hydraulic plants of the known art.

In particular, the regulation system for a thermo-hydraulic circuit 1000 of the present invention advantageously allows controlling the three-way valve and the pump in a coupled manner to obtain a more timely, adequate and efficient response for the desired temperature set point in the considered volume of fluid. In other words, by virtue of the possibility of jointly controlling the pump and the three-way valve, it is possible to carry out a control such as to act simultaneously on the valve and the pump to change the value of the flow rate alone or of the temperature alone. This is particularly distinctive with respect to the systems of the prior art which do not include controlling both the valve and the pump.

Furthermore, by virtue of the presence of an adequately calibrated model function, the system of the present invention may provide accurate tracking of pre-programmed trajectories (i.e., known in the future in terms of temperature and volumetric or mass flow rate). This specific quality also makes the invention very useful within the context of controlling industrial processes where simultaneously controlling temperature and flow rate of an energy carrier fluid is required.

In order to meet specific needs, those skilled in the art may make variations to the embodiments of the present invention or replace elements with other functionally equivalent ones.

Such variants are also contained in the scope of protection as described and claimed herein.

What is claimed is:

1. A system for regulating a thermo-hydraulic circuit, the system comprising:
   a thermo-hydraulic circuit comprising:
      a thermal machine configured to heat or cool a carrier fluid,
      at least one heat exchange terminal configured to exchange heat with a thermal load,
      a carrier fluid circulation system comprising:
         a delivery duct for transferring the carrier fluid from the thermal machine to the heat exchange terminal,
         a return duct for transferring the carrier fluid from the heat exchange terminal towards the thermal machine, and
         a three-way valve arranged along the delivery duct and fluidically connected to the thermal machine and the return duct, the three-way valve being operable to mix the carrier fluid in the delivery duct with the carrier fluid in the return duct,
   a pump installed on the delivery duct or on the return duct, adapted to pump the carrier fluid through the carrier fluid circulation system;
   at least a first temperature sensor installed on the delivery duct and adapted to measure a post-valve delivery temperature of the carrier fluid downstream of the three-way valve in a flowing direction of the carrier fluid;
   at least a second temperature sensor installed on the delivery duct or inside the thermal machine and adapted to measure a pre-valve delivery temperature of the carrier fluid upstream of the three-way valve in the flowing direction of the carrier fluid;
   at least a third temperature sensor installed on the return duct or inside the heat exchange terminal and adapted to measure a temperature of the carrier fluid downstream of the heat exchange terminal in the flowing direction of the carrier fluid and upstream of the three-way valve;
   at least one flow or flow rate sensor installed in the carrier fluid circulation system to measure a mass or volumetric flow rate of the carrier fluid in an area of the carrier fluid circulation system;
   said system further comprising:
   an electronic control unit operatively connected to the three-way valve, the first temperature sensor, the second temperature sensor, the third temperature sensor, and the flow or flow rate sensor;
   wherein said electronic control unit is configured to acquire the post-valve delivery temperature, the pre-valve delivery temperature, the mass or volumetric flow rate of the carrier fluid, the temperature of the carrier fluid downstream of the heat exchange terminal, from respective sensors;
   wherein said electronic control unit comprises a storage device in which a model function of the thermo-hydraulic circuit is stored, and a processing unit is configured to calculate values of:

a valve control signal adapted to determine an opening value of the three-way valve to mix the carrier fluid from the thermal machine and from the heat exchange terminal according to said opening value of the three-way valve;

a pump control signal adapted to regulate a value of power emitted by the pump, that is, the mass or volumetric flow rate of the carrier fluid;

wherein said processing unit is configured to calculate an estimated value of the post-valve delivery temperature and an estimated value of the mass or volumetric flow rate as output values of the model function of the thermo-hydraulic circuit and wherein said processing unit is further configured to calculate a carrier fluid delivery temperature error and a carrier fluid mass or volumetric flow rate error, wherein said carrier fluid delivery temperature error is calculated by the processing unit according to a desired value of the post-valve delivery temperature, the measured post-valve delivery temperature and the estimated value of the post-valve delivery temperature, and wherein said carrier fluid mass or volumetric flow rate error is calculated by the processing unit according to a desired value of the mass or volumetric flow rate, the value of the measured mass or volumetric flow rate of the carrier fluid and the estimated value of the mass or volumetric flow rate, said valve control signal and pump control signal being calculated according to said carrier fluid mass or volumetric flow rate error and said carrier fluid delivery temperature error.

2. The system of claim 1, wherein the thermal machine is a heat generator or a heat absorber.

3. The system of claim 1, wherein the model function consists of a family of similar transformations combined with one another by a Takagi-Sugeno type fuzzy system.

4. The system of claim 1, wherein the valve control signal and the pump control signal are calculated also according to the desired value of the mass or volumetric flow rate, the desired value of the post-valve delivery temperature, the value of the pre-valve delivery temperature, and the temperature of the carrier fluid downstream of the heat exchange terminal, wherein said pre-valve delivery temperature and said temperature of the carrier fluid downstream of the heat exchange terminal are suitably delayed over time by a respective delay transfer function to obtain a delayed pre-valve delivery temperature and a delayed carrier fluid temperature downstream of the heat exchange terminal.

5. The system of claim 1, wherein the estimated value of the post-valve delivery temperature is calculated through a third delay line starting from a first value of post-valve delivery temperature output by the model function and wherein the estimated value of the mass or volumetric flow rate is calculated by adding a second predefined time delay to a first value of mass or volumetric flow rate output by the model function.

6. The system of claim 4, wherein the delayed pre-valve delivery temperature and the delayed carrier fluid temperature downstream of the heat exchange terminal are calculated according to a delayed valve control signal according to a predetermined delay range and to a delayed pump control signal according to a second predetermined delay range.

7. The system of claim 4, wherein the delayed pre-valve delivery temperature, the delayed carrier fluid temperature downstream of the heat exchange terminal and the estimated value of the post-valve delivery temperature are calculated through auxiliary delay lines which process values of mass or volumetric flow rate signals estimated by the model function, respectively, which in turn calculates them by processing values of the valve control signal and of the pump control signal.

8. A control method for a system for regulating a thermo-hydraulic circuit, the system comprising:

a thermo-hydraulic circuit comprising:
   a thermal machine configured to heat or cool a carrier fluid,
   at least one heat exchange terminal configured to exchange heat with a thermal load,
   a carrier fluid circulation system comprising:
      a delivery duct for transferring the carrier fluid from the thermal machine to the heat exchange terminal,
      a return duct for transferring the carrier fluid from the heat exchange terminal towards the thermal machine, and
      a three-way valve arranged along the delivery duct and fluidically connected to the thermal machine and the return duct, the three-way valve being operable to mix the carrier fluid in the delivery duct with the carrier fluid in the return duct,
   a pump installed on the delivery duct or on the return duct, adapted to pump the carrier fluid through the carrier fluid circulation system;
at least a first temperature sensor installed on the delivery duct and adapted to measure a post-valve delivery temperature of the carrier fluid downstream of the three-way valve in a flowing direction of the carrier fluid;
at least a second temperature sensor installed on the delivery duct or inside the thermal machine and adapted to measure a pre-valve delivery temperature of the carrier fluid upstream of the three-way valve in the flowing direction of the carrier fluid;
at least a third temperature sensor installed on the return duct or inside the heat exchange terminal and adapted to measure a temperature of the carrier fluid downstream of the heat exchange terminal in the flowing direction of the carrier fluid and upstream of the three-way valve;
at least one flow or flow rate sensor installed in the carrier fluid circulation system to measure a mass or volumetric flow rate of the carrier fluid in an area of the carrier fluid circulation system;
said system further comprising:
an electronic control unit operatively connected to the three-way valve, the first temperature sensor, the second temperature sensor, the third temperature sensor, and the flow or flow rate sensor;
wherein said electronic control unit is configured to acquire the post-valve delivery temperature, the pre-valve delivery temperature, the mass or volumetric flow rate of the carrier fluid, the temperature of the carrier fluid downstream of the heat exchange terminal, from respective sensors;
wherein said electronic control unit comprises a storage device in which a model function of the thermo-hydraulic circuit is stored, and a processing unit is configured to calculate values of:
a valve control signal adapted to determine an opening value of the three-way valve to mix the carrier fluid from the thermal machine and from the heat exchange terminal according to said opening value of the three-way valve;

a pump control signal adapted to regulate a value of power emitted by the pump, that is, the mass or volumetric flow rate of the carrier fluid;

wherein said processing unit is configured to calculate an estimated value of the post-valve delivery temperature and an estimated value of the mass or volumetric flow rate as output values of the model function of the thermo-hydraulic circuit and wherein said processing unit is further configured to calculate a carrier fluid delivery temperature error and a carrier fluid mass or volumetric flow rate error, wherein said carrier fluid delivery temperature error is calculated by the processing unit according to a desired value of the post-valve delivery temperature, the measured post-valve delivery temperature and the estimated value of the post-valve delivery temperature, and wherein said carrier fluid mass or volumetric flow rate error is calculated by the processing unit according to a desired value of the mass or volumetric flow rate, the value of the measured mass or volumetric flow rate of the carrier fluid and the estimated value of the mass or volumetric flow rate, the values of said valve control signal and pump control signal being calculated according to said carrier fluid mass or volumetric flow rate error and said carrier fluid delivery temperature error, said control method comprising:

providing an electronic control unit comprising a storage device in which a model function of the thermo-hydraulic circuit is stored, and a processing unit; on the processing unit:

calculating an estimated value of the post-valve delivery temperature and an estimated value of the mass or volumetric flow rate as output values of the model function of the thermo-hydraulic circuit;

calculating a carrier fluid delivery temperature error according to a desired value of the post-valve delivery temperature, the measured post-valve delivery temperature and the estimated value of the post-valve delivery temperature, calculating a carrier fluid mass or volumetric flow rate error according to a desired value of the mass or volumetric flow rate, the value of the measured mass or volumetric flow rate of the carrier fluid and the estimated value of the mass or volumetric flow rate; and calculating values of the valve control signal and the pump control signal according to said carrier fluid mass or volumetric flow rate error and said carrier fluid delivery temperature error.

* * * * *